(12) United States Patent
Hulton (10) Patent No.: US 10,761,847 B2
(45) Date of Patent: Sep. 1, 2020

(54) LINEAR FEEDBACK SHIFT REGISTER FOR A RECONFIGURABLE LOGIC UNIT

(71) Applicant: MICRON TECHNOLOGY, INC., Boise, ID (US)

(72) Inventor: David Hulton, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 110 days.

(21) Appl. No.: 16/104,341

(22) Filed: Aug. 17, 2018

(65) Prior Publication Data

US 2020/0057638 A1 Feb. 20, 2020

(51) Int. Cl.
*G06F 9/30* (2018.01)

(52) U.S. Cl.
CPC ........ *G06F 9/30134* (2013.01); *G06F 9/3001* (2013.01)

(58) Field of Classification Search
None
See application file for complete search history.

(56) References Cited

U.S. PATENT DOCUMENTS

| | | | | |
|---|---|---|---|---|
| 6,301,596 B1* | 10/2001 | Karanovic | ............ | G06F 7/5443 708/306 |
| 7,028,281 B1* | 4/2006 | Agrawal | .......... | H03K 19/17728 326/41 |
| 7,257,609 B1* | 8/2007 | Kosunen | ................. | G06F 5/015 708/420 |
| 8,352,527 B1* | 1/2013 | Van Ess | ................. | H03H 17/02 708/300 |
| 9,438,203 B1* | 9/2016 | Mauer | ..................... | G06F 30/34 |
| 9,778,905 B1* | 10/2017 | Walke | ................... | G06F 7/4812 |
| 10,042,606 B2* | 8/2018 | Langhammer | .......... | G06F 5/012 |
| 2004/0103265 A1* | 5/2004 | Smith | ................... | G06F 15/177 712/15 |
| 2008/0205582 A1* | 8/2008 | Furukawa | ............. | G11C 19/00 377/77 |

OTHER PUBLICATIONS

Gupta, et al., "Deep Learning With Limited Numerical Precision", arXiv.org:1502.2551v1, Feb. 2015, p. 1-10, https://arxiv.org/abs/1502.02551v1 Feb. 9, 2015; pp. all.

* cited by examiner

*Primary Examiner* — Eric Coleman
(74) *Attorney, Agent, or Firm* — Dorsey & Whitney LLP (57) ABSTRACT

An apparatus in a configurable logic unit may include a configurable logic unit (CLU) configured to receive first and second operands and to perform an operand operation and generate an operation value. The apparatus may also include: a random value generator for generating a random value; an adder coupled to the CLU and the random value generator and configured to generate a sum of the operation value and the random value; and a shift register coupled to the adder and configured to shift the sum by a number of bits to generate shifted data at an output. The random value generator may be a linear feedback shift register. The output may be coupled to an additional CLU so that the shifted data may be used for subsequent operand operations. The apparatus may be implemented in a digital signal processor slice in a configurable logic block.

20 Claims, 7 Drawing Sheets

LINEAR FEEDBACK SHIFT REGISTER FOR A RECONFIGURABLE LOGIC UNIT

TECHNICAL FIELD

The present disclosure is generally related to a reconfigurable logic unit and examples are described which may improve data precision in a computation in the reconfigurable logic unit.

BACKGROUND

Many processing architectures exist to accomplish extensive computations such as machine learning and artificial intelligence tasks. For example, data computations may be implemented using hardware computing platforms, such as an integrated circuit (IC), an application-specific integrated circuit (ASIC), a digital signal processor (DSP) implemented as part of a field-programmable gate array (FPGA), or a system-on-chip (SoC). These hardware platforms may include reconfigurable logic units having digital signal processing (DSP) capabilities, such as adders, multipliers, and other arithmetic logic units (ALUs) utilized in combination. The computations implemented in these hardware computing platforms may be executed in various applications. For example, digital signal processing for wireless communications, such as digital baseband processing or digital front-end implementations, may be implemented using the hardware computing platforms. Multimedia processing and digital radio frequency (RF) processing may also be implemented using hardware computing platforms. However, the constraints of hardware platforms often limit the capabilities of data computations compared to a desktop computing system.

DETAILED DESCRIPTION

Example systems and methods described herein include an apparatus that implements data trimming in a hardware platform, such as an integrated circuit, to perform various computations or operations with higher data precision. Such techniques may, for instance, be employed in machine learning, artificial intelligence, or wireless communication schemes to solve various technical problems. For example, a logic unit performing an operation having two operands may be capable of handling eight bits for each operand. The result from the operand operation must be trimmed to eight bits in order to be utilized by any subsequent operation.

Recent trends show that reduced precision methods have been used in various machine learning acceleration architectures to make machine learning tasks more efficient. For example, the computations in a simple fully connected layer with 8-bit values may be translates directly to a matrix multiply, which requires multiply accumulate between a row and column of the input matrices to calculate a single value in the output matrix. If multiple 8-bit values are multiplied with each other and then accumulated, the results need to be rounded to fit 8-bit result to be processed by the next layer. In comparison, to properly store the result without rounding, 8-bit*2+log 2(m) bits may be required. For example, if m is 16, then 20 bits are needed to store the result. When a float value of high precision is reduced to a low precision fixed integer values, such as a 20-bit value being reduced down to an 8-bit value, it becomes a challenge to ensure that subtle differences that would normally be rounded off, are maintained through the layers of the network. Simple rounding up or round down by left shift or right shift may not sufficiently meet this challenge. For example, a simply right-shifted value with an 8-bit mask applied thereto may end up with resulting values that are relatively high or most being extremely low (in the 8-bit space), in which case most of these values end up getting rounded down and then become indistinguishable from each other, resulting in a major loss of these subtle characteristics throughout the rest of the network.

By way of example, to address such issues and/or other issues, an apparatus as described herein may use a shift register to trim one or more bits of data so that the trimmed data can be fed into a low-bit algorithm logic unit for subsequent operations. This apparatus may be suitable for computations that employ multiple operations involving one or more common operands. For example, some machine learning applications may often involve processing of the same operand multiple times in a single DSP time period or single flop. In some scenarios, a decision tree may be utilized in a variety of machine learning applications, such as learning a wireless communications parameter, a data analytics parameter, a processing parameter for a hardware device unit, or a financial transaction parameter.

A decision tree can include a variety of paths that change based on a preceding branch of the tree. Each node in a decision tree may represent a different computation that stems from a common operand of that node. For example, a common operand combined with a variety of other operands may create respective branches that stem from a node at a certain level in the tree. The node of the tree may be the common operand, with each branch representative of a processing result (e.g., an intermediate or final processing result), when that common operand is combined with another operand.

In some applications, to determine the most efficient path in a decision tree, a computation of each branch may be used in ascertaining the most efficient path, e.g., as defined by an optimization problem that the decision tree may be solving. For example, a sum, weighted combination, or any mathematical combination of branches in the tree may be representative of a path, with the most efficient path through the tree passing a threshold or passing the other computation results of logically similar paths. A similar path may start at an initial node and end at a final node, with paths defined by different branches to traverse from the initial node to the final node. In some applications, the optimization problem may include a least squares solution to a set of training data that includes input and output for training a machine learning model. Other optimizations, such as a convex optimization when training data may be modeled as a convex set, are also possible.

Additionally, a DSP may be utilized to forward a common operand to another DSP for the computation of a machine learning algorithm. In some implementations of DSP slices in an FPGA architecture, a DSP may receive operands and process such operands. For example, the DSP may process the operand by utilizing the operand in a digital signal processing operation or any operand computation utilized in a method or process that the DSP implements. DSP slices may process complex operands, such as 8 or 16 bit operands, with other complex operands in a single DSP slice.

However, machine learning applications (e.g., a machine learning algorithm) may not require complex operands. Some machine learning applications may prioritize processing speed and efficiency over the complexity and precision that complex operands may provide to other applications. For example, some machine learning applications may utilize operands that are less complex, such as operands that are 1, 2, or 4 bits. Accordingly, it may be advantageous to provide a DSP architecture that does not process all received operands or process a common operand more frequently than other operands. In some examples, the DSP architecture may skip or avoid processing all received operands or may process a common operand more frequently than other operands.

In examples of systems described herein, rather than retrieving an operand from a cache and sending that same operand to each DSP slice of an FPGA, an existing DSP slice may forward a common operand to another DSP slice; or an existing FPGA architecture may forward the common operand along a column of a plurality of DSP slices. Accordingly, examples of systems, apparatuses, and methods described herein may allow for more efficient (relative to apparatuses that retrieve operands from a cache) processing in machine learning applications, such as solving an optimization problem with a decision tree.

As described herein, a common operand in a machine learning application may be provided to logically similar DSP slices of an FPGA in order to be processed more efficiently. Accordingly, in the example of a common operand being a node of a tree, each branch of that tree may be computed substantially in parallel at each of the DSP slices, for example, as compared to a DSP slice that may sequentially compute each branch of that tree, with the common operand being retrieved multiple times in succession from an operand register. As an example of a common operand being forwarded in a machine learning application, a decision tree implementation of a machine learning application may utilize such forwarding of a common operand, which may be referred to as performing one or more learning operations.

Figure 1:
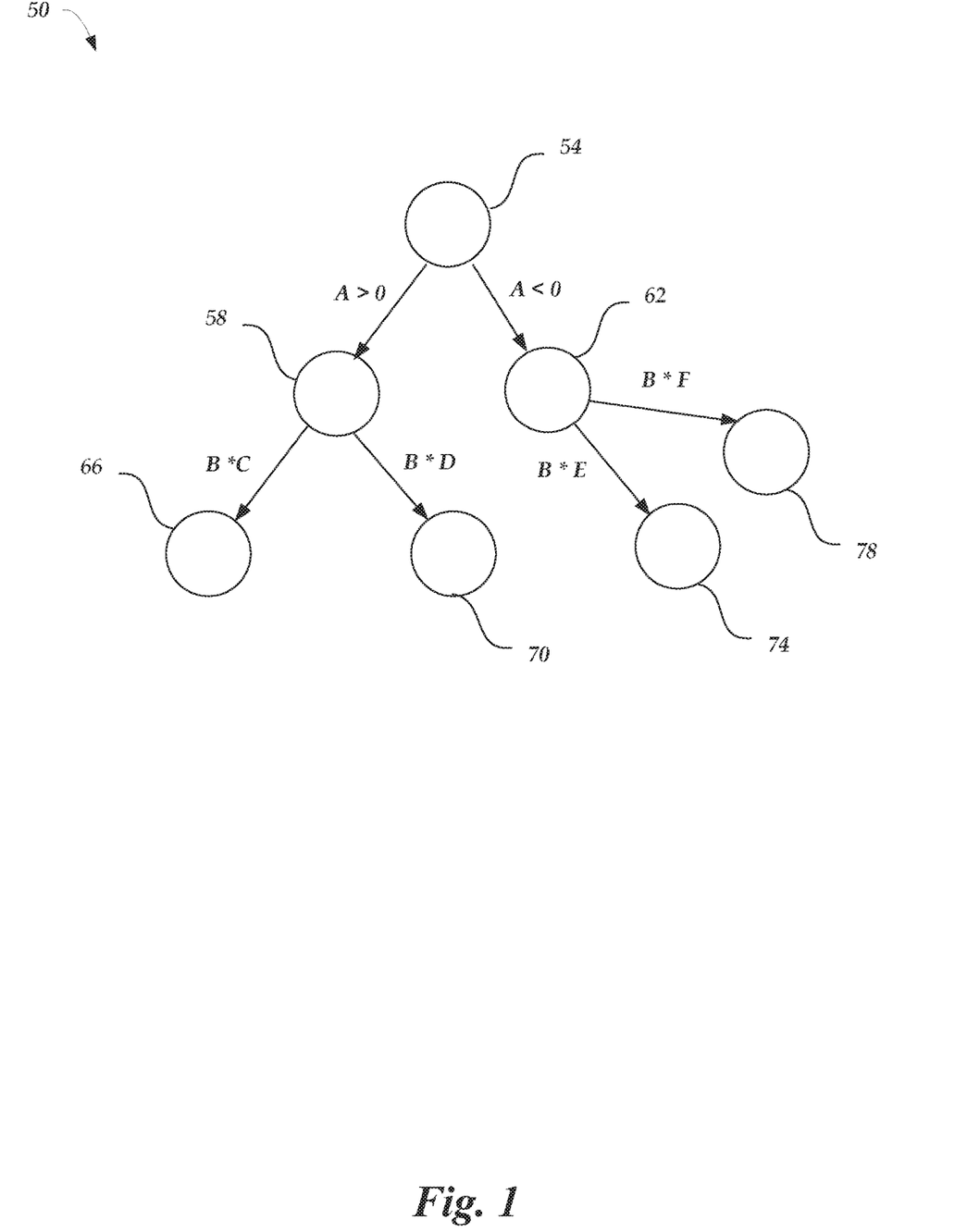
FIG. 1 is a block diagram of an example decision tree in a machine learning task in accordance with some examples of the present disclosure.

In FIG. 1, a decision tree 50 may be utilized in machine learning operations to determine a parameter. For example, decision tree 50 may be utilized to determine a likelihood of an event occurring, e.g., a cell phone call dropping. At tree node 54 of decision tree 50, a comparison operation may be executed regarding an operand A. For example, operand A may represent a probability of a cell phone being in a certain region. The comparison operation may compare operand A to a value of zero. Accordingly, a probability of the cell phone being in the certain region could be represented by a positive or negative integer corresponding to the probability, such that the value zero in the comparison is equivalent to a 50% probability. Accordingly, if the cell phone has such a probability, the decision tree 50 operates to a guide an operation according to another determination regarding another parameter of the likelihood of an event occurring. In the example, if the cell phone is in a certain region, decision flow proceeds to tree node 58 from tree node 54. If the cell phone is not in the certain region, decision flow proceeds to tree node 62 from tree node 54. Both such comparison operations may be executed in an FPGA in one or more DSP slices. In such a case, the operand A may be forwarded to another DSP slice, such that both comparison operations leading to tree nodes 58, 62 may occur in the same processing thread.

With continued reference to FIG. 1, the next operation may multiply the probability of the cell phone being in the region by the probability of that cell phone being connected to a particular base station and/or device. The operands C, D, E, and F may represent probabilities of various base stations and/or devices being connected to the example cell phone, with its probability of being connected being represented as operand B. Such multiply operations may be executed in an FPGA in one or more DSP slices. In such a case, the operand B may be forwarded to one or more DSP slices, such that both multiply operations leading to leaf nodes 66, 70, 74, and 78 may occur in the same processing thread. Accordingly, the branches of tree nodes 58, 62 may lead to leaf nodes 66, 70, 74, and 78 that correspond to a likelihood of a cell phone call dropping for a cell phone connected to one of the base stations and/or devices represented by the operands C, D, E, and F, respectively, whether in the region or not. While described in the context of a cell phone call dropping, the decision tree 50 may guide various operations with varying likelihoods for various devices.

As another example of a decision tree 50 being utilized in a learning operation, a learning operation may determine the most efficient path from an initial node to a final node, having used common operands to define each intermediate node between the initial node and the final node, with the branches of nodes representative of computations at each node that combine the common operand with another operand. An efficient path in the decision tree 50 may be a path of the tree 50 from the tree node 54 to a leaf node 66, 70, 74, or 78 with the lowest likelihood of the cell phone call dropping. Learning operations may be performed, for example, to ascertain parameters in various fields such as wireless communications or financial transactions. In each case, a learning operation may determine a parameter based on an efficient path of a decision tree that evaluates varying scenarios utilizing that parameter. For example, the parameter may be an initial node of the decision tree or a final node of the decision tree, and paths may be constructed that determine an efficient outcome for an operation that utilizes that parameter (e.g., as an initial tree node) or ends with that parameter (e.g., as a final leaf node).

Figure 2:
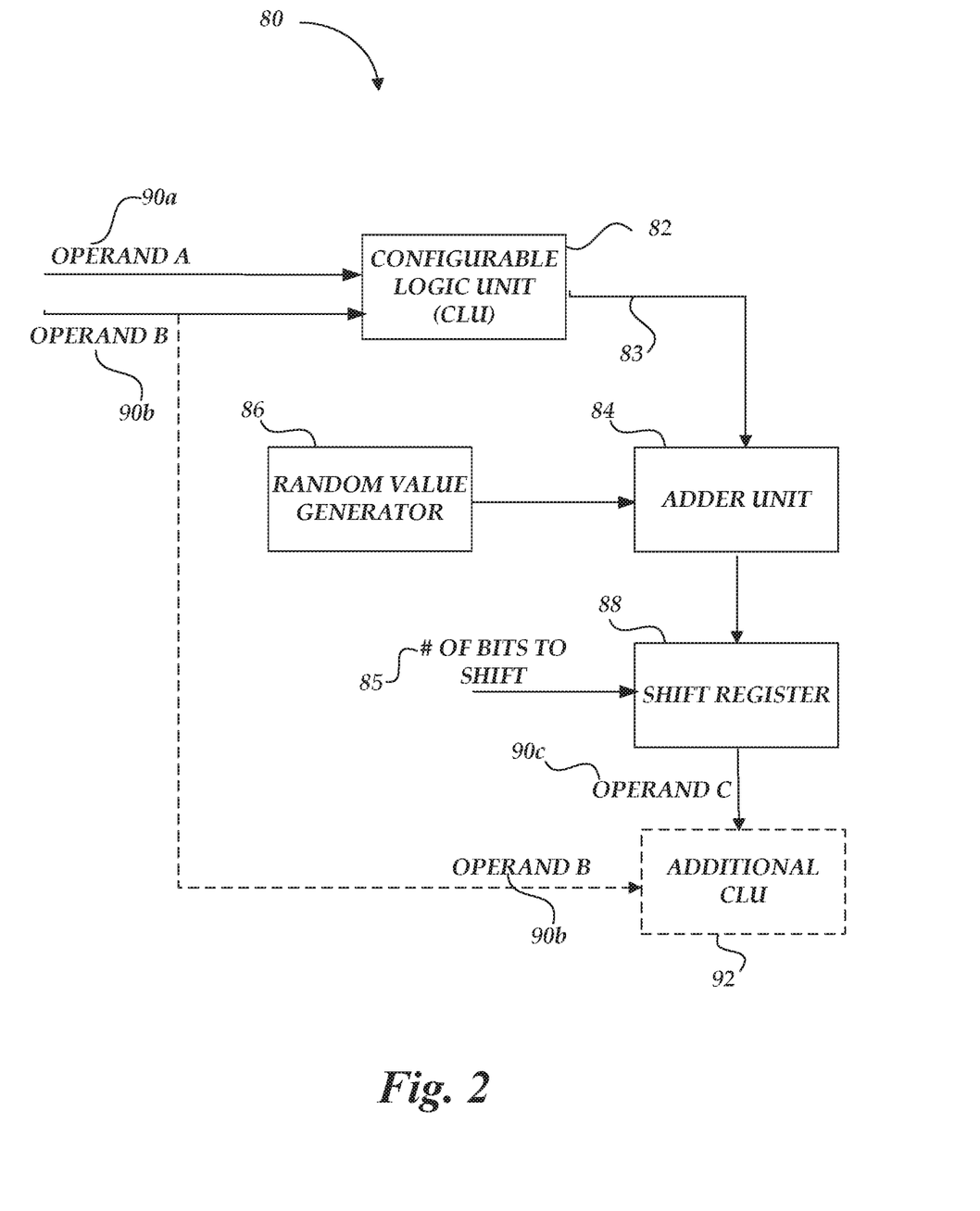
FIG. 2 is a block diagram of an example apparatus in accordance with some examples of the present disclosure.

In FIG. 2, an apparatus 80 suitable for executing the above mentioned decision tree or other computations is illustrated. Apparatus 80 may include a configurable logic unit (CLU) 82 configured to receive one or more input operands to perform an operand operation and generate an operation value at an output. For example, CLU 92 may receive operand A (90a) and operand B (90b), and generate an operation value at an output 83 based at least on the input operands. In some scenarios, depending on the hardware constraints, each input operand for CLU 82 may be of low bit-width, for example, at 8 bits. While the result of the operand operation at output 83 may be stored with a higher bit-width, e.g., at 16 bits, and may need to be trimmed to a low bit-width in order to be used to perform additional operand operations by the current or additional CLUs 92, which is explained in further detail below.

In some scenarios, apparatus 80 may include a random value generator 86 configured to generate a random value. Apparatus 80 may also include an adder unit 84 that is coupled to the CLU 82 and the random value generator 86. Adder unit 84 may be configured to generate a sum based on the operation value at the output 83 of CLU 82 and the random value provided by the random value generator 86. Apparatus 80 may also include a shift register 88. The shift register 88 may be coupled to the adder 84 and also have an output. Shift register 88 may be configured to shift the sum from the adder unit 84 by a number of bits to generate shifted data at the output. In some scenarios, shift register 88 may receive a control signal 85 that indicates the number of bits to be shifted in generating the shifted data at the output. For example, the number of bits to be shifted may be 1 bit, 2 bits, 4 bits, 8 bits or other values. Shift register 88 may receive control signal 85 any suitable source, such as a bus, an interconnect in a configurable logic block or an operation mode control unit in a DSP slice, which is explained in further detail herein. Random value generator 86 may be a linear feedback shift register. In some scenarios, random value generator 86 may be a right shift register.

In the above illustrated examples in FIG. 2, an operation value at output 83 of CLU 82 may be added to a random number value before being trimmed by shift register 88. Additionally, the trimmed value, e.g. operand C (90c) may be an input to the additional CLU 92 which is coupled to the shift register. CLU 92 may receive the shifted data from the output of shift register 88. CLU 92 may also receive additional operand(s) and perform operand operations based on the shifted data from the shift register 88 and the additional operand(s). In some scenarios, the additional operand(s) may also include at least a common operand to CLU 82, for example, operand B (90b).

The illustrated apparatus can be implemented in various hardware platforms. For example, the above illustrated apparatus may be implemented in a DSP slice, in which case the CLU 82 may receive the input operands, e.g., 90a, 90b, from an interconnect. The output of shift register 88 may also be coupled to the interconnect. This is further illustrated in detail with reference to FIGS. 3A and 3B.

Figure 3A:
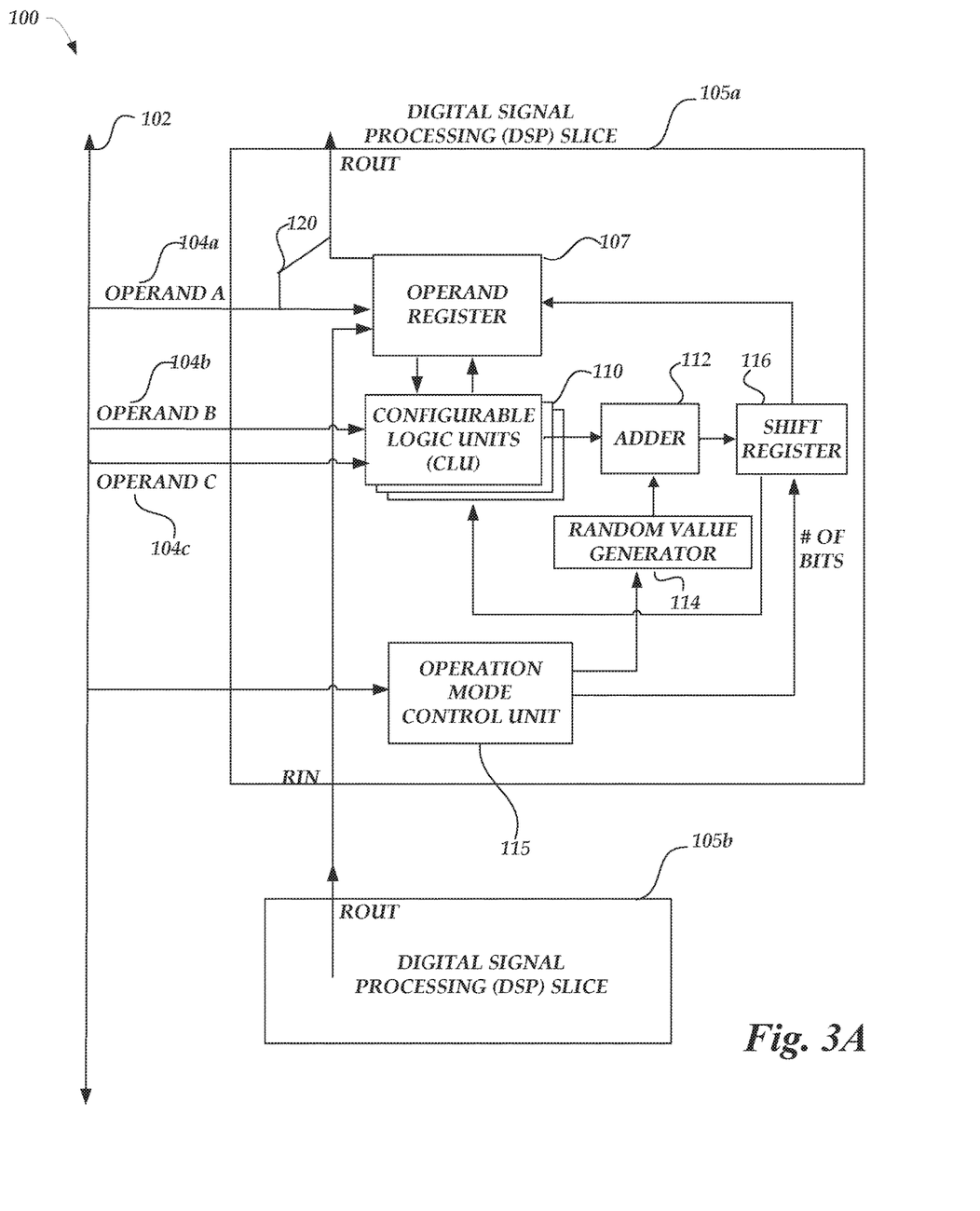
FIGS. 3A-3B are block diagrams of example DSP slices in accordance with various examples of the present disclosure.

In FIG. 3A, an apparatus 100 may include multiple configurable logic blocks that include multiple DSP slices, for example, DSP slices 105a and 106b. Apparatus 100 may include an interconnect 102 coupled to the multiple DSP slices 105a, 105b. DSP slices 105a-b may be logical circuits that may be coupled or cascaded to form different DSP circuits. For example, several DSP slices 105a-b may be cascaded to form a 256-point Fast Fourier Transform (FFT) circuit that processes certain time-domain inputs to generate a frequency-domain output. DSP slices 105a-b may be cascaded or coupled to other DSP slices to form other DSP circuits that perform DSP operations. While only two DSP slices 105a, 105b are depicted in FIG. 3A, apparatus 100 may include any suitable number of DSP slices, such as those described with reference to FIG. 4. Each DSP slice 105a-105b may include logic units (e.g., an arithmetic logic unit) that implement a portion or all of DSP operations performed by the apparatus 100. For example, DSP slice 105a may perform a first portion of a DSP operation including operand multiplication and DSP slice 105b may perform a second portion of that DSP operation including operand addition. The apparatus 100 may be implemented in various hardware platforms, including but not limited to: an ASIC, a chiplet, a DSP implemented in an FPGA, or a SoC.

In FIG. 3A, apparatus 100 may reside in a DSP slice, where a cascade of DSP slices that are connected together such that a DSP slice may provide at least one output path that is also used as at least one input path to another DSP slice. For example, DSP slice 105b includes an output path ROUT that is coupled to DSP slice 105a as the input path RIN to the DSP slice 105a. Such an output path ROUT may provide operands processed or received by the DSP slice 105b to the DSP slice 105a. In various embodiments, operands may be of various bit lengths, such as 2, 4, or 8 bits. In some examples, while not shown in FIG. 1, the output path ROUT and/or the input path RIN may be coupled to the interconnect 102, such that the inputs and/or outputs of some of the DSP slices may be coupled via the interconnect 102, rather than direct connections between individual DSP slices, such as depicted in the cascaded coupling of DSP slice 105a to the DSP slice 105b. In some scenarios, the output path ROUT may be an output of the DSP slice 105a. In some examples, the output path ROUT may be in an input path to another DSP slice 105b, via the interconnect 102.

In some scenarios, the DSP slice 105a may forward an operand received directly from an input path coupled to the interconnect 102 to another DSP slice in the apparatus 100 via the output path ROUT of the DSP slice 105a. For example, a connection 120 may be provided between an input path of the DSP slice 105a and an output path thereof that may also be cascaded to other DSP slice. For example, connection 120 may be provided between an input path for operands of the DSP slice 105a (e.g., the input path of operand A 104a) and the output path ROUT of the DSP slice 105a. Connection 120 may be provided by a wire, a soldering or a circuit in an integrated circuit. In other scenarios, each of the DSP slices 105a, 105b may also be independently performing certain computations without sharing common operands with other DSP slices.

With further reference to FIG. 3A, each DSP slice, e.g., 105a, may include an operand register 107, one or more CLUs 110, and an operation mode control unit 115. Operand register 107 may include an input port for an input path coupled to interconnect 102. Operand register 107 may also include input and output data paths to one or more CLUs 110. Operand register 107 may store an operand in its register such that a CLU 110 may request that operand for a calculation and/or computation. For example, the operand register 107 may receive and store operand A 104a. Operand register 107 may also receive and store calculated operands from one or more of the CLUs 110.

One or more CLUs 110 may perform a variety of arithmetic or DSP operations. CLUs 110 may be an arrangement of circuit elements or a single circuit that performs such an operation. For example, one or more of CLUs 110 may include various logical unit(s), such as AND, OR, NOT, NAND, NOR, XOR, or XNOR gates, to implement an adder unit, a multiplier unit, an accumulator unit, a multiply-accumulate unit, a carry-in unit, a carry-out unit, a bit shifter, a logic unit configured with NAND gates, and/or generally any type of arithmetic logic unit or DSP logic unit that may process DSP operations. CLUs 110 may include input ports for input paths coupled to the interconnect 102. Each of the CLUs 110 or one or more of the CLUs 110 working in combination may receive and process operands via a corresponding input path to that CLU 110 or the one or more of the CLUs 110 working in combination. For example, a first CLU 110 may receive the operand B 104b to process that operand in a CLU configured as an adder that adds a stored operand from the operand register 107. A second CLU 110 may receive the operand C 104c to process that operand in a CLU configured as a multiplier that multiplies the result of an addition operation from the first CLU 110 with the operand C 104c.

With further reference to FIG. 3A, a DSP slice, e.g., 105a, 105b, may also include above illustrated embodiments in FIG. 2 that may be configured to trim data provided by one or more CLUs. In some scenarios, each DSP slice 105a, 105b may include an adder 112 coupled to at least one of the plurality of CLUs 110 and a random value generator 114. Random value generator 114 is configured to generate a random value. Random value generator 114 may include a linear feedback shift register, such as a left or right shift register. Random value generator 114 may be coupled to the operation mode control unit 115 to receive control signals. Adder 112 may be configured to generate a sum based on an output value of the CLUs 110 and the random value generated by the random value generator 114. Each DSP slice 105a, 105b may also include a shift register 116 coupled to the adder 112, where shift register 116 is configured to shift the sum provided by adder 112 by a number of bits to generate shifted data. In some scenarios, the shift register 116 is coupled to the operation mode control unit 15 to receive a control signal indicating the number of bits. This is explained further as below.

In some scenarios, operand register 107 may be coupled to the output of the shift register 116 to receive the shifted data. Additionally or alternatively, one or more CLUs may also be coupled to the shift register 116 to receive the shifted data. In these scenarios, the shifted data may be used by one or more CLUs to perform subsequent operations using common operands or additional operands. Additionally or alternatively, operand register 107 may also be configured to output the shifted data to the output of the DSP slice, e.g., 105a, to be sent to an additional DSP slice.

In some scenarios, in each DSP slice 105a, 105b, operation mode control unit 115 may receive respective control signals indicating an operation mode for that DSP slice. For example, the operation mode may include one or more of an adder mode, a multiplier mode, an accumulator mode, a multiply-accumulate mode, a carry-in mode, a carry-out mode, or any type of arithmetic logic mode or DSP logic mode. Operation mode control unit 115 may receive the control signals from the interconnect 102. In one implementation, apparatus 100 may include a number of DSP slices 105a, 105b to perform machine learning application such as calculating nodes of a decision tree 50. Each of the DSP slices 105a, 105b may include a variety of input ports to receive and process operands from the interconnect 102. Apparatus 100 may provide operands on the interconnect 102 according to routing instructions stored or received by the apparatus 100.

Additionally or alternatively, operation mode control unit 115 may be configured to determine the number of bits to be shifted by the shift register 116 responsive to the control signals received from the interconnect. In some scenarios, operation mode control unit 115 may determine the number of bits to be shifted based on the type of operand operation in the control signal. The operation model control unit 115 may generate an output control signal that indicates the number of bits to be shifted. The shift register 116 may be coupled to the operation mode control unit 115 to receive the output control signal from the operation mode control unit 115. For example, the control signal received by operation mode control unit 115 may indicate an adder mode, based on which the result of the operand operation may not require trimming. In such a case, the number of bits to be shifted may be zero. In another example, the operation mode may include a multiplication, the result of which may have a higher bit-width than that of the input operands. For example, the input operands for the operand register may be of 8 bits, and the output of the CLUs may be of 16 bits. In such a case, the number of bits to be shifted by the shift register 116 may be 8 bits in order to trim the result of operand operation to the 8 bits to be used for subsequent operand operations. When a right shift register is used, the lower 8 bits will be trimmed. When a left shift register is used, the upper 8 bits will be trimmed. As can be appreciated by one skilled in the art, any suitable trimming method may be used. In some other scenarios, the number of bits to be shifted may also be received by a shift register directly from an interconnect.

Figure 3B:
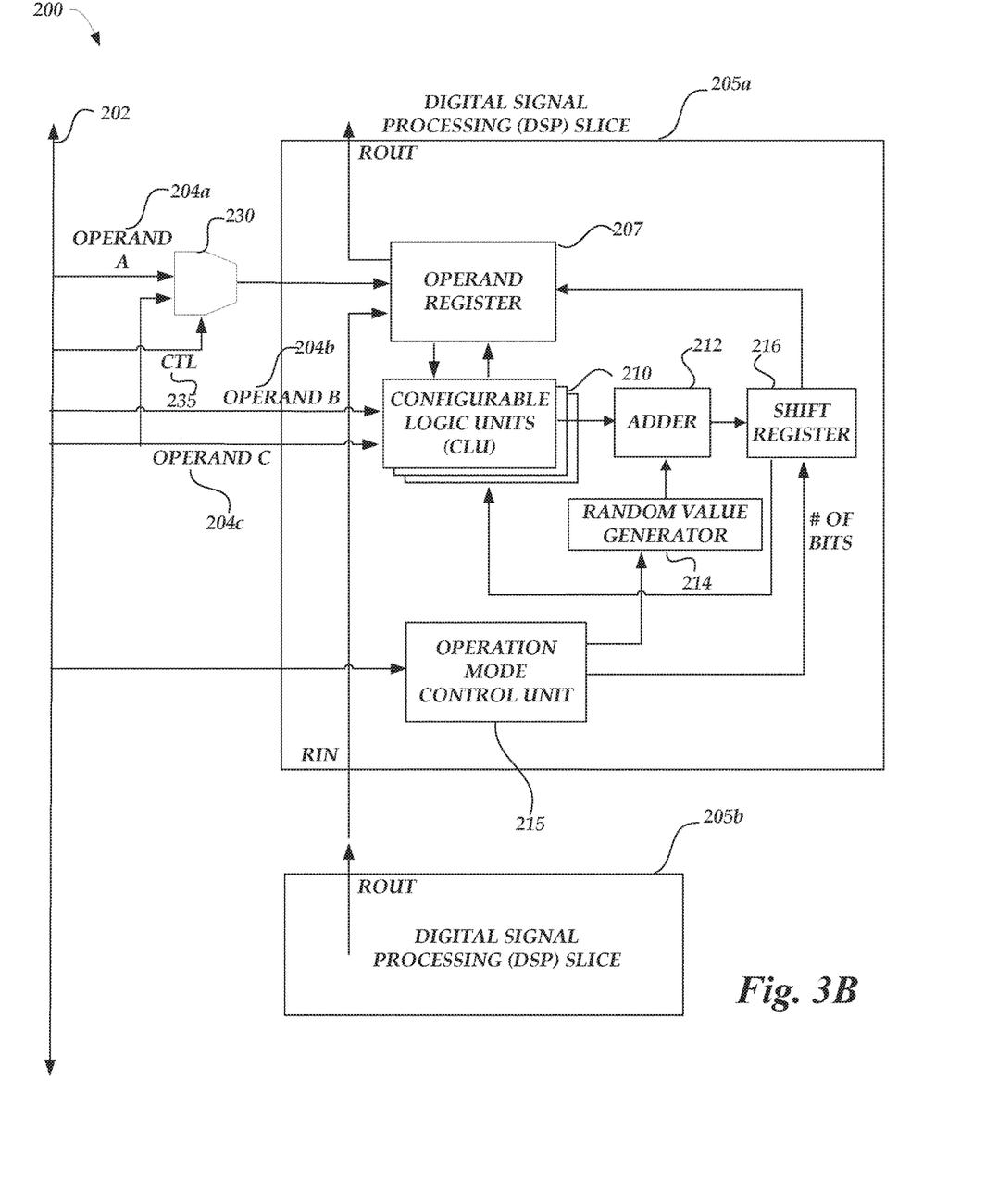

In FIG. 3B, an example apparatus 200 similar to apparatus 100 in FIG. 3A is shown. Apparatus 200 may include an interconnect 102 and DSP slices 205a-205b coupled thereto. Similarly numbered elements of FIG. 3B as compared to FIG. 3A may be implemented by, be used to implement, and/or may operate in the same way as described above with reference to FIG. 3A. Additionally or alternatively, apparatus 200 may include a switch 230 coupled to the interconnect 202 and configured to select a first input having a first operand, e.g., operand A (204a) or a second input having a common operand, e.g., operand C (204c). Each of the CLUs 210 is coupled to the interconnect 220. At least one of the CLUs 210 is configured to receive the common operand. In some scenarios, operand register 207 may be configured to receive an output from the switch 230 and to communicate a selected operand to one or more of the CLUs 210.

Switch 230 may receive a control signal CTL 235 from the interconnect 202, where the control signal indicates to the switch a selection of the operand inputs. Input paths to the switch may include an input path for an operand A 204a and an input path coupled to an input path of the DSP slice 205a. As depicted in FIG. 3B, the input path of the DSP slice 205 for the operand C 204c is coupled to the input path of the switch 230. Accordingly, if a common operand is determined to be provided to DSP slice 205a for an operation including a common operand, the interconnect 202 may provide the common operand as operand C 204c, which will also be provided to an input path of the switch 230. For example, control signal CTL 235 may be received as a control signal via the interconnect 202 from a control logic (e.g., control logic 320 in FIG. 4). The control signal may represent a determination as to whether the common operand is to be provided to the DSP slice 205a. For example, the determination that the common operand is to be provided to the DSP slice 205a may occur during execution of an instruction set for operations to be performed by the DSP slices 205a, 205b.

Figure 4:
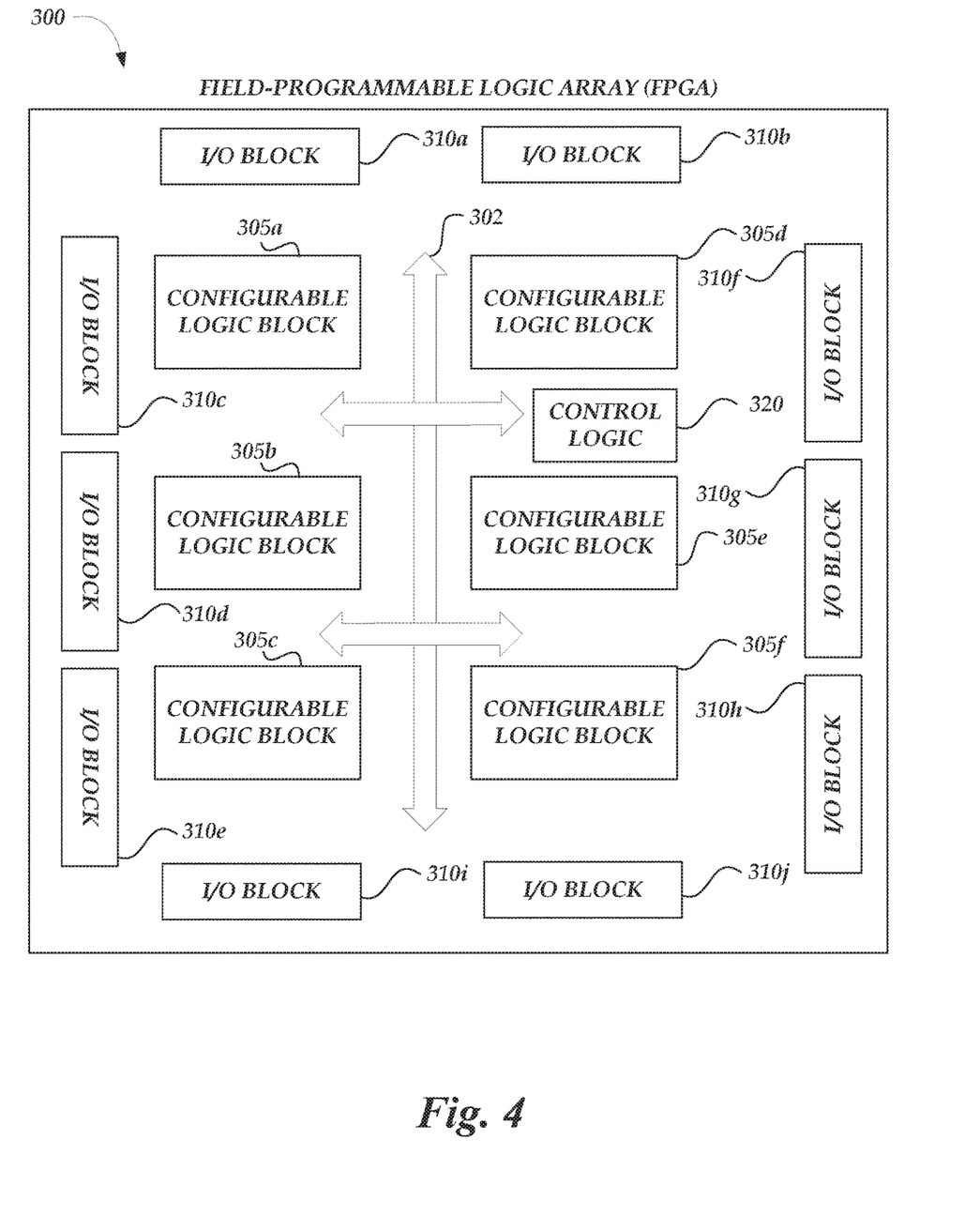
FIG. 4 is a block diagram of an example FPGA in accordance with various examples of the present disclosure.

In FIG. 4, the apparatus described in the examples in FIG. 2A may be implemented with an FPGA such as apparatus 300. In some scenarios, apparatus 300 may include an interconnect 302, with configurable logic blocks 305a-305f, I/O blocks 310a-310j, and control logic 320 coupled thereto. While only eight configurable logic blocks 305a-305f and ten I/O blocks 310a-310j are depicted in FIG. 4, apparatus 300 may include any suitable number of configurable logic blocks and I/O blocks 310a-310j. Apparatus 300 may cascade configurable logic blocks 305a-305f together such that a configurable logic block 305a-305f may provide at least one output path as at least one input path to another configurable logic block.

A configurable logic block 305a-305f may be implemented using a programmable logic block, such as a computer-readable medium storing instructions, or a logic circuit comprising one or more logic units, such as one or more NAND gates. The configurable logic blocks 305a-305f may be cascaded across logical rows and columns with I/O blocks 310a-310j bounding respective rows and columns for connections external to the apparatus 300. The configurable logic blocks 305a-305f may implement a DSP slice that performs DSP operations, such as DSP slice 105a, 105b (FIG. 3A) or DSP slices 205a, 205b (FIG. 3B). A configurable logic block 305a-305f being implemented as a DSP slice may be referred to as a DSP unit or a DSP block of the apparatus 300.

Certain configurable logic blocks 305a-305f configured to operate as DSP slices may be logically analogous or similar circuits that are cascaded in the apparatus 300 to perform a single or multiple DSP operations. The DSP operations performed by the DSP slices may change individually or in combination. An operation mode control of each DSP slice may receive respective control signals indicating an operation mode for each DSP slice, such as an adder mode, a multiplier mode, an accumulator mode, a multiply-accumulate mode, a carry-in mode, a carry-out mode, and/or any type of arithmetic logic mode or DSP logic mode.

Control logic 320 may include instructions sets (e.g., one or more program instructions or operations) to be performed by the configurable logic blocks 305a-305f. Control logic 320 may include, for example, computer software, hardware, firmware, or a combination thereof configured to provide instruction sets from a storage device to the configurable logic blocks 305a-305f. For example, the instruction sets may include instructions to perform certain logic or arithmetic operations on data, transmit data from one configurable logic block 305a-305f to another configurable logic block 305a-305f, or perform other operations. In some examples, an instruction set may be loaded onto the control logic 320 and include instructions that represent a determination as to whether a common operand is to be provided to a particular configurable logic block 305a-305f for an operation including a common operand. The control logic 320 may retrieve instructions for the configurable logic blocks 305a-305f from one or more memories, such as a volatile (e.g., dynamic random access memory (DRAM)) or nonvolatile memory (e.g., Flash memory). The instruction sets may be stored in one or more data structures, such as a database. Control logic 320 may be configured to provide control signals to various circuits, such as those depicted in FIGS. 3A and 3B. For example, responsive to receiving a memory access command (e.g., read, write, program), the control logic 320 may provide control signals to control the configurable logic blocks 305a-305f to forward a common operand.

In one implementation, apparatus 300 may include a number of configurable logic blocks 305a-305f, implemented as DSP slices, to perform machine learning applications such as traversing nodes of a decision tree. Each of the DSP slices may include a variety of input ports to receive and process operands from the interconnect 102 (FIG. 3A). The DSP slices may be implemented as DSP slices 105a, 105b (FIG. 3A) and/or DSP slices 205a, 205b (FIG. 3B) to more efficiently process an operation including a common operand. Apparatus 300 may provide operands (e.g., a common operand) on the interconnect 302 according to routing instructions stored or received by apparatus 100 (FIG. 3A).

Figure 5:
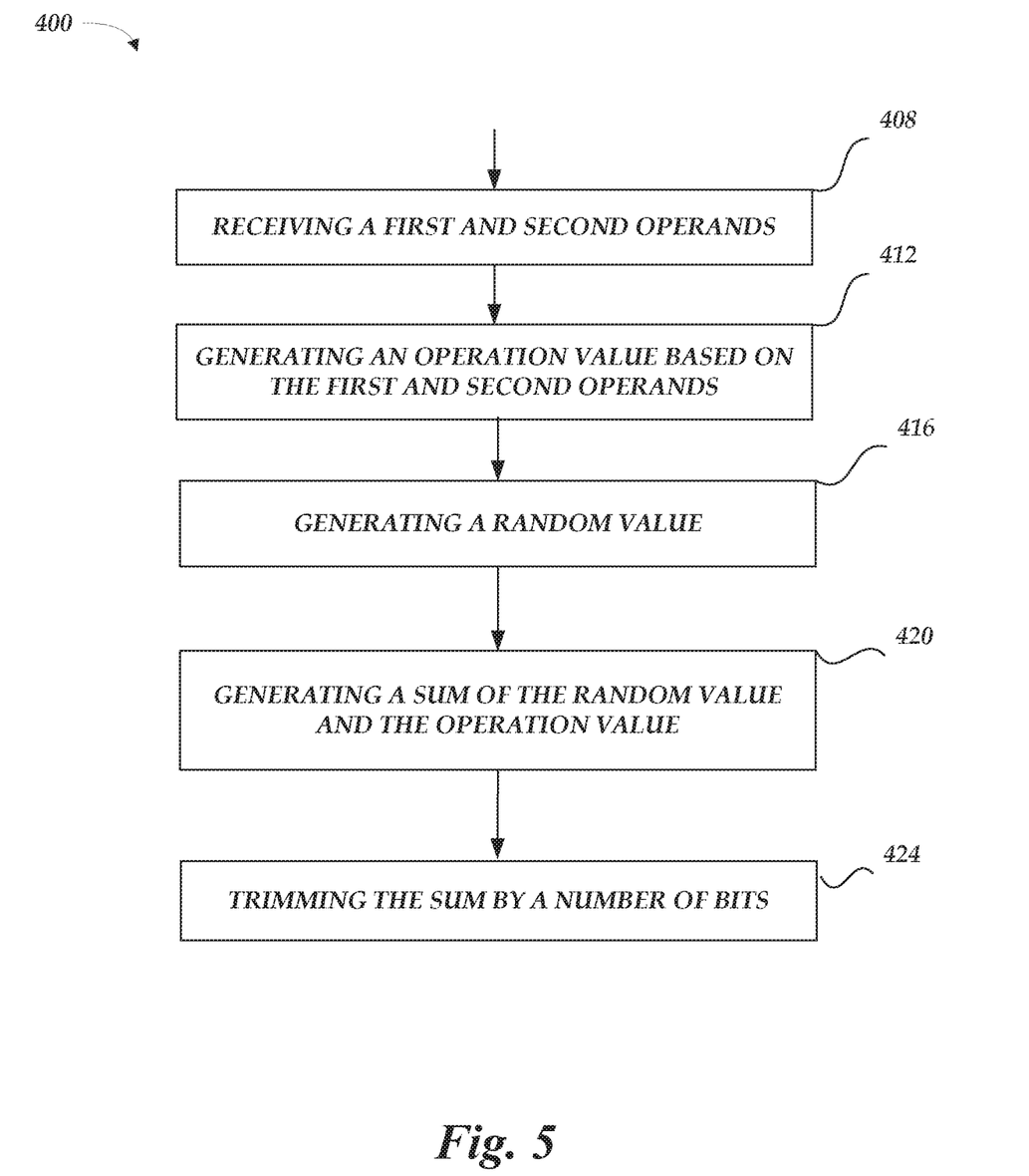
FIG. 5 is a flow diagram of an example process of trimming data according to some examples of the present disclosure.

Various methods may be implemented in the example apparatuses illustrated above with reference to FIGS. 2, 3A-3B and 4. In FIG. 5, an example process may include receiving first and second operands 408, generating an operand operation value based on the first and second operands 412, generating a random value 416, generating a sum of the random value and the operand operation value 420, and trimming the sum by a number of bits 424 to generate an output data.

In some scenarios, receiving the first and second operands 408 may be implemented by a CLU (e.g., 82 in FIG. 2). Block 408 may also be implemented by an operand register in a configurable logic block or a FPGA having multiple configurable logic blocks (e.g., 107 in FIG. 3A, 207 in FIG. 3B). In both scenarios, the first and second operands may be received from the interconnect (e.g., 102 in FIG. 3A, 202 in FIG. 3B). Generating the operand operation value 412 may be implemented in one or more CLUs (e.g., 82 in FIG. 2, 110 in FIG. 3A, 210 in FIG. 3B). Generating the random value 416 may be implemented by a suitable random value generator. For example, the random value generator may be a linear feedback shift register, such as a left or right shift register (e.g., 86 in FIG. 2, 114 in FIG. 3A, 214 in FIG. 3B). Generating the sum of the random value and the operand operation value 420 may be implemented in any suitable adder (e.g., 84 in FIG. 2, 112 in FIG. 3A, 212 in FIG. 3B). Trimming the sum by a number of bits 424 may be implemented in a shift register (e.g., 88 in FIG. 2, 116 in FIG. 3A, 216 in FIG. 3B). The number of bits to be shifted may be received by the shift register from an interconnect. The number of bits to be shifted may also be received from an output control signal from an operation mode control unit in a DSP slice or a configurable logic block (e.g., 115 in FIG. 3A, 215 in FIG. 3B).

The blocks included in the described example process 400 are for illustration purposes. In some examples, the blocks may be performed in a different order. In some other examples, various blocks may be eliminated. In still other cases, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 6:
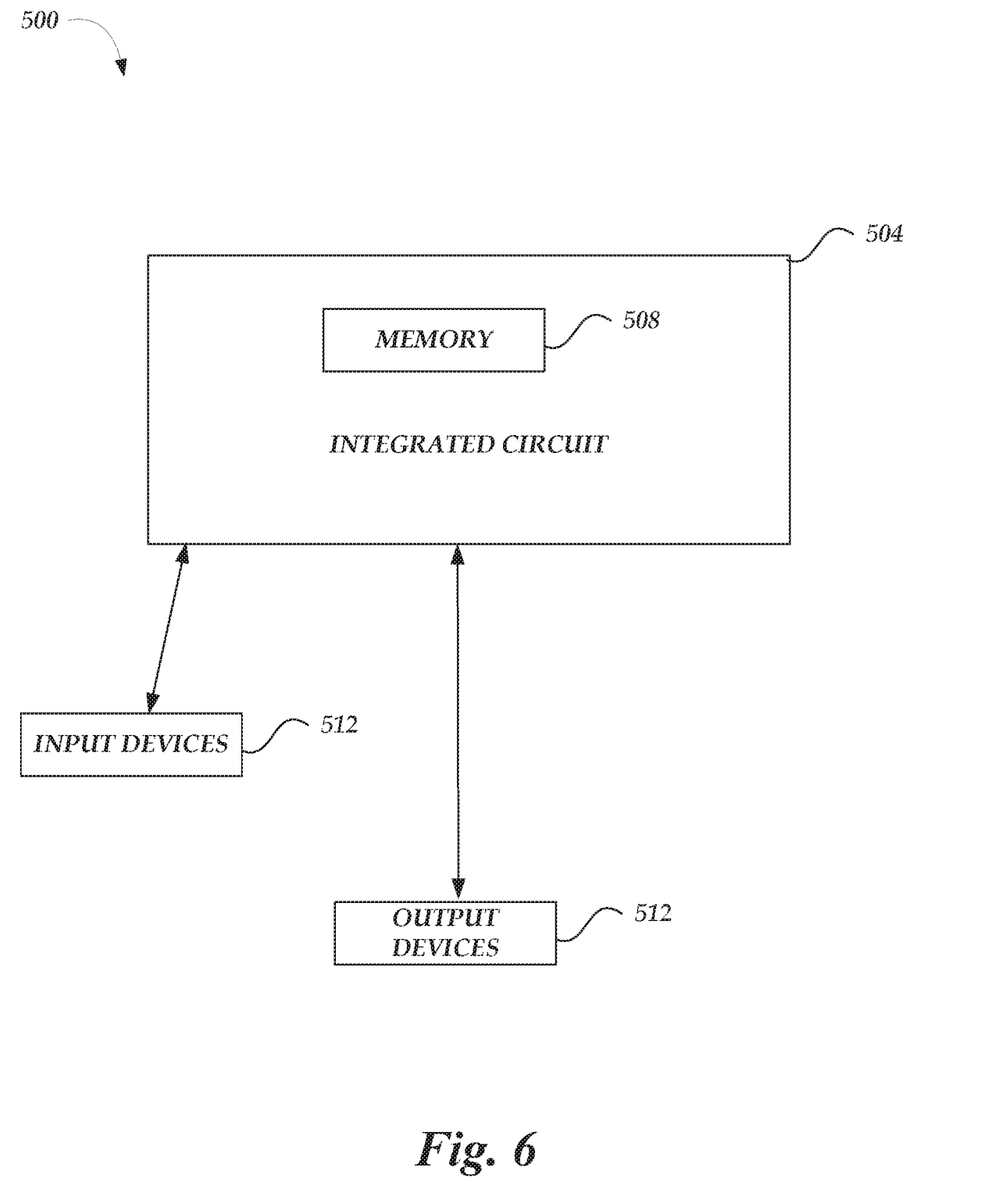
FIG. 6 is a block diagram of an example apparatus in accordance with various examples of the present disclosure.

FIG. 6 is a block diagram of a system 500 including an integrated circuit 504. The integrated circuit 504 may be implemented by any of the example apparatuses described herein, such as apparatus 80, 100, 200, or 300 (in FIGS. 2-4). Integrated circuit 504 may include a memory 508. Integrated circuit 504 may be coupled through address, data, and control buses to the memory 508 to provide for writing data to and reading data from the memory 508. Memory 508 may be located in a common package or on a common substrate with integrated circuit 504, or memory 508 may be physically remote or isolated from integrated circuit 504. Integrated circuit 504 includes circuitry for performing various processing functions, such as executing specific software to perform specific calculations or tasks. In performing such various processing functions, integrated circuit 504 may utilize the methods described above in FIG. 5. In addition, integrated circuit 504 may also include one or more input devices 512, such as a keyboard or a mouse, coupled to the integrated circuit 504 to allow an operator to interface with the integrated circuit 504. Integrated circuit 504 may also include one or more output devices 512 coupled to the integrated circuit 504, such as output devices 512 typically including a printer and a video terminal.

Various embodiments described in FIGS. 1-6 provide examples of stochastic rounding using a LFSR that will facilitate acceleration architectures in efficiently performing machine learning tasks. For example, with an FPGA implementation, an LFSR is added to the design before right-shift and masking. As this type of workload becomes more prevalent, it is anticipated that the rounding could be efficiently pulled into the FPGA ALU and be included as a final output step, to allow the implementation to fit into certain commercial DSP chips. For example, an implementation in FIG. 3A of a rounding operation on a P operator with operands A, B and C may include:

$$P=B*C+A \text{(first cycle only)}$$

$$P=B*C+P \text{(middle cycles)}$$

$$P=\text{RNDSTOC}(P,D) \text{(last cycle only)}$$

The RNDSTOC(P, D) function may perform the stochastic rounding using D as the right_shift value used for generating the random number (most likely masked from an internal LFSR) and return a right shifted result into P which may then be used by the FPGA logic as: RNDSTOC(P, D)=(P+(LFSR & (1<<D−1)))>>D. This results in space savings because FPGA logic does not need to store a larger intermediate result before rounding, and saves LFSR logic needed for generating the random values.

Certain details are set forth above to provide a sufficient understanding of described embodiments. However, it will be clear to one skilled in the art that embodiments may be practiced without additional particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The various illustrative blocks and modules described in connection with the disclosure herein may be implemented or performed with a general-purpose processor, a digital signal DSP, an FPGA, an application-specific integrated circuit (ASIC), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Various functions described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications may be made without deviating from the spirit and scope of the present disclosure. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus comprising:
a configurable logic unit configured to receive first and second operands and configured to perform an operation by generating an operation value based at least on the first and second operands;
a random value generator configured to generate a random value;
an adder coupled to the configurable logic unit and the random value generator and configured to generate a sum based on the operation value and the random value; and
a shift register coupled to the adder and having an output, wherein the shift register is configured to trim the sum by shifting a number of bits to generate shifted data at the output, wherein the number of bits shifted is based at least on a mode of the operation.

2. The apparatus of claim 1, wherein the random value generator is a linear feedback shift register.

3. The apparatus of claim 2, wherein the shift register is a right shift register.

4. The apparatus of claim 1, wherein the configurable logic unit is configured to receive the first and second operands from an interconnect.

5. The apparatus of claim 4, wherein the output of the shift register is coupled to the interconnect.

6. The apparatus of claim 1, wherein the shift register is configured to receive a control signal indicating the number of bits to shift in generating the shifted data at the output.

7. The apparatus of claim 1, wherein the shift register is coupled to an additional configurable logic unit configured to:
receive at least one of the first and second operands;
receive the shifted data from the output of the shift register; and
use the at least one of the first and second operands and the shifted data to perform an operation.

8. The apparatus of claim 1 resides in a digital signal processing (DSP) slice, wherein the shift register is coupled to an operation mode control unit of the DSP slice to receive the control signal indicating the number of bits.

9. An apparatus, comprising:
a plurality of configurable logic blocks including a first digital signal processing (DSP) slice and a second DSP slice; and
an interconnect configured to couple the plurality of configurable logic blocks;
wherein the first DSP slice is coupled to an input of at least the second DSP slice via an output of the first DSP slice, the first DSP slice comprising:
a plurality of configurable logic units configured to perform an operation;
a random value generator configured to generate a random value;
an adder coupled to at least one of the plurality of configurable logic units and the random value generator and configured to generate a sum based on an output value of the configurable logic unit and the random value;
a shift register coupled to the adder and configured to trim the sum by shifting a number of bits to generate shifted data, wherein the number of bits shifted is based at least on a mode of the operation; and
an operand register having an operand input coupled to at least one of the plurality of configurable logic units and configured to output the shifted data to the output of the first DSP slice.

10. The apparatus of claim 9, wherein the random value generator is a linear feedback shift register.

11. The apparatus of claim 9, wherein the first DSP slice further comprises an operation mode control unit configured to:
receive a control signal indicating an operation mode of the first DSP slice, wherein the first DSP slice is configured to receive a plurality of operands and the control signal from the interconnect; and
determine the number of bits to be shifted by the shift register.

12. The apparatus of claim 11, wherein the shift register is coupled to the operation mode control unit of the DSP slice to receive an output control signal indicating the number of bits.

13. The apparatus of claim 9, further comprising:
a switch coupled to the interconnect and configured to select a first input of the switch having a first operand or a second input of the switch having a common operand, wherein:
each of the configurable logic units is coupled to the interconnect, wherein at least one of the configurable logic units is configured to receive the common operand; and
the operand register is configured to receive an output from the switch and to communicate a selected operand to at least one of the plurality of configurable logic units.

14. The apparatus of claim 9, wherein at least one configurable logic unit of the plurality of configurable logic units comprises at least one of an adder, a multiplier, a logic unit configured as a NAND gate, an accumulator, or a bit shifter.

15. A method comprising:
receiving, by a first configurable logic unit, first and second operands;
performing, by the first configurable logic unit, an operation to generate an operation value based at least on the first and second operands;
generating, by a random value generator, a random value;
adding, by an adder, the random value generator and the operation value to generate a sum; and
trimming the sum, by a shift register, by shifting the sum by a number of bits to generate shifted data at an output of the configurable logic unit, wherein the number of bits shifted is based at least on a mode of the operation.

16. The method of claim 15, wherein the random value generator a linear feedback shift register.

17. The method of claim 16, wherein the shift register is a right shift register.

18. The method of claim 15, wherein receiving the first and second operands comprises receiving the first and second operands from an interconnect.

19. The method of claim 18 further comprising outputting the shifted data to the interconnect.

20. The method of claim 15, further comprising:
outputting, by the first configurable logic unit, the shifted data to an input of a second configurable logic unit;
receiving, by the second configurable logic unit, at least one of the first and second operands; and performing, by the second configurable logic unit, an operation based on the at least one of the first and second operands and the shifted data to generate an output data.

* * * * *